United States Patent

[11] 3,573,448

[72] Inventor Ralph D. Valentine
Owego, N.Y.
[21] Appl. No. 844,765
[22] Filed July 25, 1969
[45] Patented Apr. 6, 1971
[73] Assignee International Business Machines Corporation
Armonk, N.Y.

[54] HYBRID MULTIPLIER
11 Claims, 8 Drawing Figs.

[52] U.S. Cl. ....235/150.52, 340/347, 235/150.5
[51] Int. Cl. ....H03k 13/02, G06g 7/16, G01j 1/00
[50] Field of Search ....235/150.5, 150.52; 340/347 (DA)

[56] References Cited
UNITED STATES PATENTS
3,146,343 8/1964 Young.... 235/150.5

*Primary Examiner*—Eugene G. Botz
*Attorneys*—Hanifin and Jancin and Norman R. Bardales

ABSTRACT: A multiplier circuit using analogue and digital techniques in which a multistage register is employed to store one or two quantities to be multiplied. Digital information corresponding to each of the low order numbers is shifted in the register in the high order direction to its corresponding highest order binary related number capable of being stored in the register to allow the processing of both the high and low order numbers in the same linear portion of the operating characteristic of succeeding analogue components provided by the circuit. The multiplication operation is performed with these high order numbers of the particular quantity. At the output, a second shift register stores digital information corresponding to the resultant product of the high order number quantity and the other quantity. If a shift operation was performed in the other register, the digital information stored in the second register is shifted therein in the downward direction an equal number of times. As an alternative embodiment a third register is also provided for storing digital information corresponding to the other quantity. This last-mentioned digital information is shifted in the third register in an upward direction for the low order numbers of the particular quantity in a manner similar to the shifting operation provided for the first register. The multiplication operation in the alternate embodiment is performed with the high order numbers of both quantities, and the resultant digital information stored in the second shift register is shifted in the downward direction a number of times equal to the shifts, if any, provided in the first and third registers.

INVENTOR
RALPH D. VALENTINE

BY

ATTORNEY

Patented April 6, 1971 3,573,448

5 Sheets-Sheet 4

| A | TRUE | ACT | 15 | 14 (7) | 13 | 12 (6) (3) | 11 | 10 (5) | 9 | 8(4)(2)(1) |
|---|---|---|---|---|---|---|---|---|---|---|
| 1 | 225 | 224 | 15 | | | | | | | |
| 2 | 210 | 208 | | 15 | | | | | | |
| 3 | 196 | 192 | | 14 (7) | | | | | | |
| 4 | 195 | 192 | | | 15 | | | | | |
| 5 | 182 | 176 | | | 14 (7) | | | | | |
| 6 | 180 | 176 | | | | 15 | | | | |
| 7 | 169 | 160 | | | 13 | | | | | |
| 8 | 168 | 160 | | | | 14 (7) | | | | |
| 9 | 165 | 160 | | | | | 15 | | | |
| 10 | 156 | 144 | | | | 13 | | | | |
| 11 | 154 | 144 | | | | | 14 (7) | | | |
| 12 | 150 | 144 | | | | | | 15 | | |
| 13 | 144 | 144 | | | | 12 (6)(3) | | | | |
| 14 | 143 | 128 | | | | | 13 | | | |
| 15 | 140 | 128 | | | | | | 14(7) | | |
| 16 | 135 | 128 | | | | | | | 15 | |
| 17 | 132 | 128 | | | | | 12 (6) (3) | | | |
| 18 | 130 | 128 | | | | | | 13 | | |
| 19 | 126 | 112 | | | | | | | 14 (7) | |
| 20 | 121 | 112 | | | | | 11 | | | |
| 21 | 120 | 112 | | | | | | | | 15 |
| 22 | 120 | 112 | | | | | | 12(6)(3) | | |
| 23 | 117 | 112 | | | | | | | 13 | |
| 24 | 112 | 112 | | | | | | | | 14(7) |
| 25 | 110 | 96 | | | | | | 11 | | |
| 26 | 108 | 96 | | | | | | | 12 (6) | |
| 27 | 104 | 96 | | | | | | | | 13 |
| 28 | 100 | 96 | | | | | | 10 (5) | | |
| 29 | 99 | 96 | | | | | | | 11 | |
| 30 | 96 | 96 | | | | | | | | 12 (6)(3) |
| 31 | 90 | 80 | | | | | | | 10 (5) | |
| 32 | 88 | 80 | | | | | | | | 11 |
| 33 | 81 | 80 | | | | | | | 9 | |
| 34 | 80 | 80 | | | | | | | | 10 (5) |
| 35 | 72 | 64 | | | | | | | | 9 |
| 36 | 64 | 64 | | | | | | | | 8(4)(2)(1) |

y x

HYBRID MULTIPLIER

The invention herein described was made in the course of or under a contract or subcontract thereunder, with the Department of the Air Force.

BACKGROUND OF THE INVENTION

This invention relates to multiplier circuit apparatus and more particularly to multiplier circuits utilizing digital and analogue techniques.

While generally multiplier circuits of the type utilizing analogue and digital techniques are well known in the art, heretofore, they were not readily adaptable to processing high order and low order numbers in the same linear portion of the operation characteristic of the analogue components utilized therein. As a consequence, these type prior art multipliers were adversely affected in accuracy, and/or required additional components and complexity for processing the low and high order numbers.

SUMMARY OF THE INVENTION

It is an object of this invention to provide multiplier circuit apparatus utilizing analogue and digital techniques which is relatively simple.

It is still another object of this invention to provide multiplier circuit apparatus of the aforementioned type which allows processing of the low and high order numbers in the same linear portion of the operating characteristic of certain of its analogue components.

According to one aspect of the invention a multiplier circuit apparatus employs analogue and digital techniques. The circuit apparatus includes a first signal generator means which has first multistage shift register means for storing digital information corresponding to a first quantity to be multiplied and a first digital-to-analog converter means having first binary conditioning input means coupled to said first register means. The first converter means has a first analogue input and a first analogue output. The circuit apparatus also includes second signal generator means for providing an analogue signal corresponding to a second quantity to be multiplied. In addition, a reference signal generator provides an analogue reference signal having a predetermined reference level. First comparator means is provided having a first pair of inputs and an output. One of the inputs of the first pair is coupled to the reference signal generator. The first converter has its first analogue input coupled to the output of the first comparator means and its first analogue output coupled to the input of the first comparator means so as to provide a feedback path for the particular comparator means. In addition, second comparator means, which has a second pair of inputs and an output, has one of these inputs responsive to the analogue signal of the second generator means. Also provided is a third signal generator means which includes second digital-to-analogue converter means, digital conditioning means and a second multistage shift register. The second digital-to-analogue converter means has second binary input means, a second analogue input coupled to the output of the first comparator means, and a second analogue output coupled to the other input of the aforementioned second pair of the second comparator means. The digital conditioning means has output means for conditioning the second binary input means. The conditioning means has an input coupled to the output of the second comparator means. The second multistage shift register means has an input means coupled to the output means of the digital conditioning means and stores the information of the digital conditioning means. The circuit apparatus also includes control means for providing a first control signal for shifting the digital information the first register means in the upward direction to place the most significant bit of the last-mentioned digital information in the highest order stage of the first register means whenever the last-mentioned digital information stored therein does not have a binary 1 bit in the highest order stage. The control means also provides a second control signal for shifting the information in the second register means in the downward direction a number of shifts equal to the number of shifts required to shift the digital information in the first register means by said first control signal.

The foregoing and other objects, features and advantages of the invention will be apparent from the following more particular description of the preferred embodiments of the invention as illustrated in the accompanying drawings.

BRIEF DESCRIPTION OF THE DRAWINGS

In the FIGS., like elements are designated with similar reference numerals.

DESCRIPTION OF THE PREFERRED EMBODIMENTS

Figure 1:
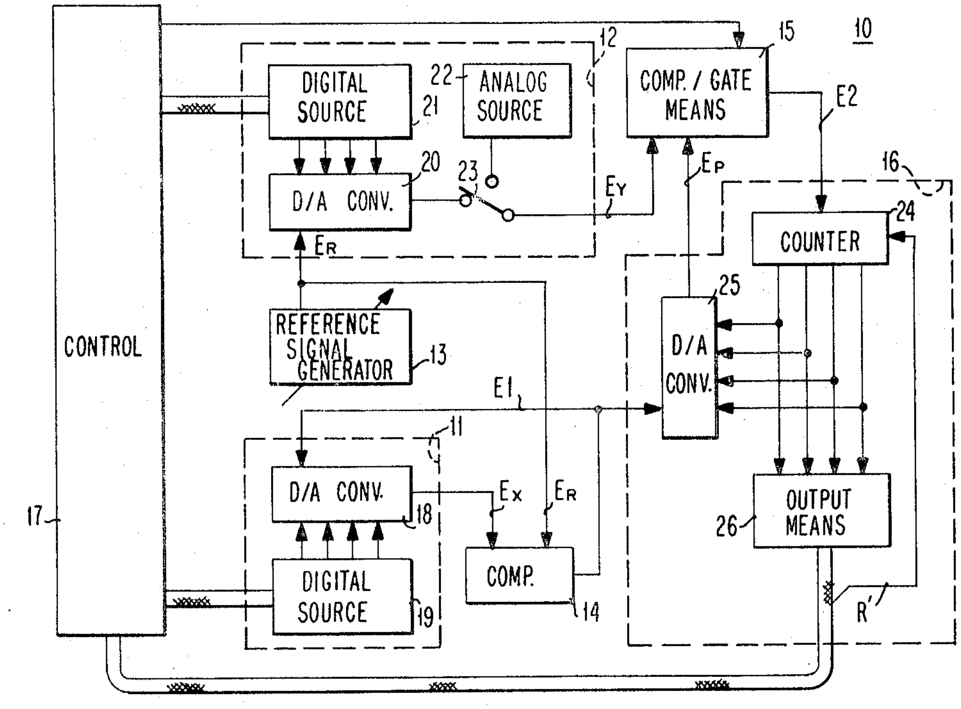
FIG. 1 is a simplified block diagram of a preferred embodiment of the multiplier circuit apparatus of the present invention.
Figure 4:
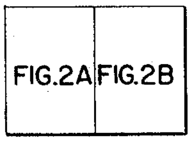
FIGS. 4 and 5 are diagrams showing the relative juxtapositions of FIG. 2A and FIG. 2B, and FIG. 3A and FIG. 3B, respectively.
Figure 5:
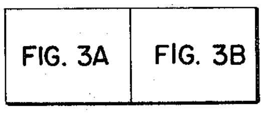

Referring now to FIG. 1 there is shown a simplified block diagram of a preferred embodiment of the multiplier circuit apparatus 10 of the present invention. Signal generators 11 and 12 generate analogue signals Ex and Ey, respectively. The reference signal generator 13 provides a reference signal Er. Signals Er, Ex, and Ey are compatibly scaled with respect to each other. Comparator 14 compares signals Ex and Er. The comparator of the comparator/gate combination circuit means 15 compares signal Ey with the analogue signal up which is generated by the product signal generator 16.

Control means 17 provides various control signals for the signal generators 11, 12 and 16 as well as the gate of the aforementioned comparator/gate circuit means 15 as will be explained in greater detail hereinafter.

At least one of the signal generators 11, 12 is provided with a digital-to-analogue converter, sometimes hereinafter referred to as a D/A converter, and a digital source; e.g., the D/A converter 18 and digital source 19 of generator 11. The D/A converter 18 converts digital information provided by the digital source 19 into the aforementioned analogue signal Ex. In accordance with the principles of the present invention digital information representing the quantity X>O to be multiplied is stored in a register, not shown in FIg. 1, which is included in source 19. If the digital information does not have a binary 1 bit in the high order bit position of the register, sometimes hereinafter referred to as the X register, a shifting operation is performed until a binary 1 appears in the most significant bit position of the X register. If the digital information already contains a binary 1 in the most significant position, the shifting operation is not performed. The output signal El generated by comparator 14 is fed back to the analogue input of the D/A converter 18. The level of signal Ex is dependent upon the level of the input analogue signal El and the particular digital conditioning signals appearing at the output of digital source 19 and being applied to the D/A converter 18. Because the comparator 14 and D/A converter 18 are configured in a feedback arrangement, the signal Ex is driven to the level of signal Er whereupon the comparator 14 is placed in a balanced condition. At this time, signal El is proportional to the digital information present in the aforementioned X register of source 19.

As shown in FIG. 1, the signal generator 12 may also include a D/A converter 20 and digital source 21. D/A converter 20 converts digital information representing the quantity Y>O from the digital source 21 into the aforementioned analogue signal Ey. Signal Er of generator 13 is used as the input analogue signal for D/A converter 20. Digital source 21 is also contains a register, not shown in FIG. 1. The digital information corresponding to the quantity Y is stored in this register, sometimes hereinafter referred to as the Y register. In accordance with the principles of the present invention the Y information is then shifted, if required, in the Y register under a 1 appears in the most significant bit position of the Y register. The level of the analogue signal Ey is dependent upon the level of the analogue input signal Er and the particular digital conditioning signals being applied to the D/A converter 20 by source 21. Furthermore, the level of signal Ey is proportional to the digital information stored in the aforementioned register of source 21.

Alternatively, the analogue signal Ey may be provided by an analogue source 22 directly by appropriate positioning of the arm of switch 23. In either case, the output signal Ey is compared via means 15 with the analogue signal Ey of generator 16. At an appropriate time the normally open gate of the comparator/gate combination circuit means 15 is periodically closed. Each time the gate is so closed, the output signal E2 causes the counter 24 of generator 16 to advance as long as the inputs of the comparator of means 15 are in an unbalanced condition and more particularly signal Ep<Ey. The signal Ep is provided by the D/A converter 25 of generator 16 to which is applied the analogue input signal El from comparator 14. The counter 24 continues to advance until its output digital signals which are conditioning the D/A converter 25 in coaction with the analogue input signal El being applied to D/A converter 25 cause the level of the output signal Ep to be equal to or greater than the level Ey. A balanced condition is produced in the comparator of means 15 whenever the level of signal Ep is equal to or greater than the signal Ey. Once the comparator of means 15 is so balanced, the operation of the counter 24 terminates. The number, i.e., digital information, contained in counter 24 is transferred to another register not shown in FIG. 1, of output means 26 where it is then shifted from this register's high order bit locations to the register's low order bit locations a number of times equal to the number of shifts, if any, utilized to shift the X information in the aforementioned X register of digital source 19 and to the number of shifts, if any, utilized to shift the Y information in the Y register of the digital source 21 when utilized. The output means 26 thereafter provides the information in its aforementioned register, sometimes hereinafter referred to as the product register, as a corresponding digital signal, and/or alternatively a converted analogue signal, which approximates the product of the quantities X and Y being multiplied.

Figure 2A:
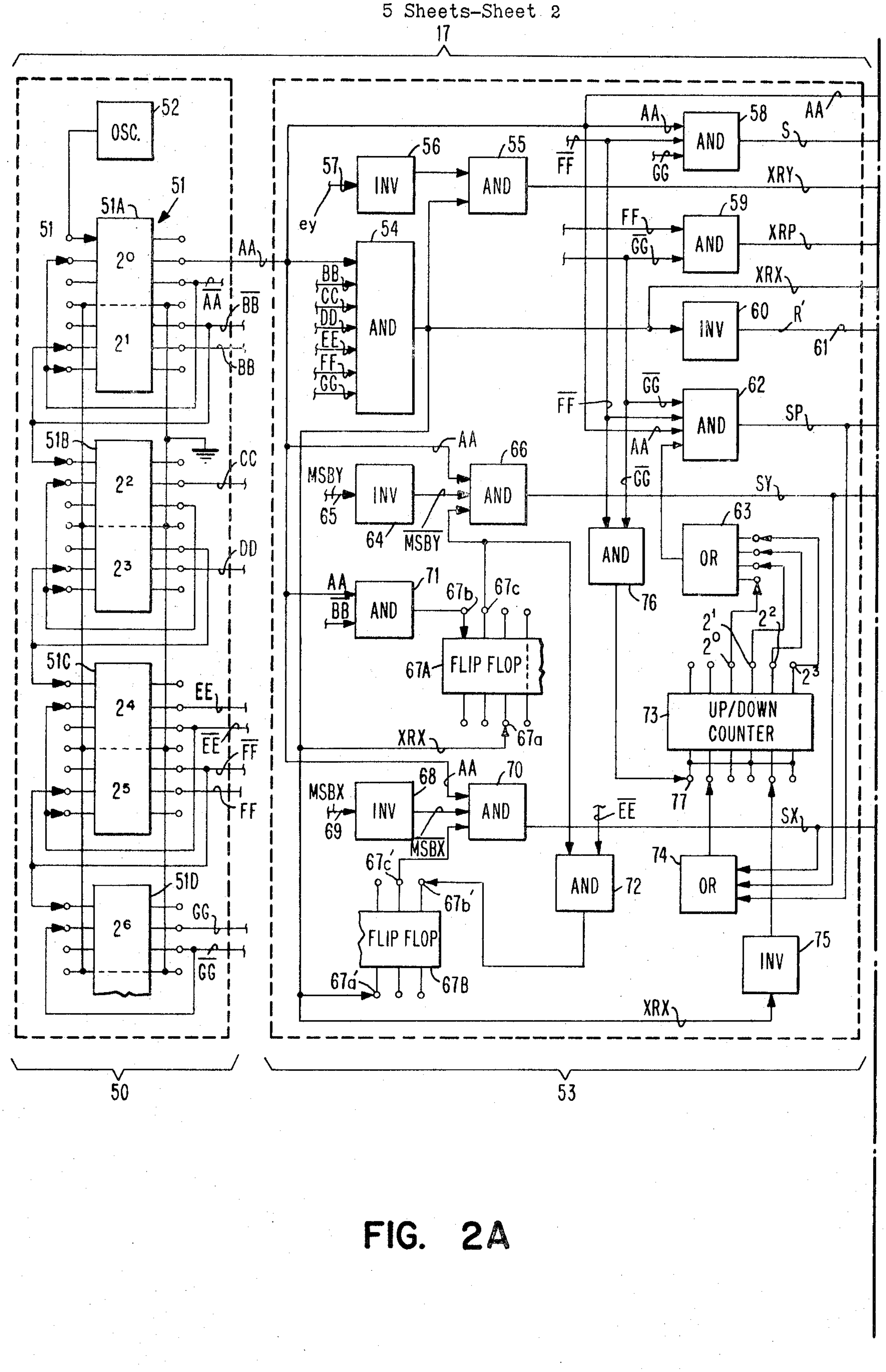
FIGS. 2A—2B is a schematic diagram, partially shown in block form, illustrating in greater detail the circuit apparatus of FIG. 1.
Figure 2B:
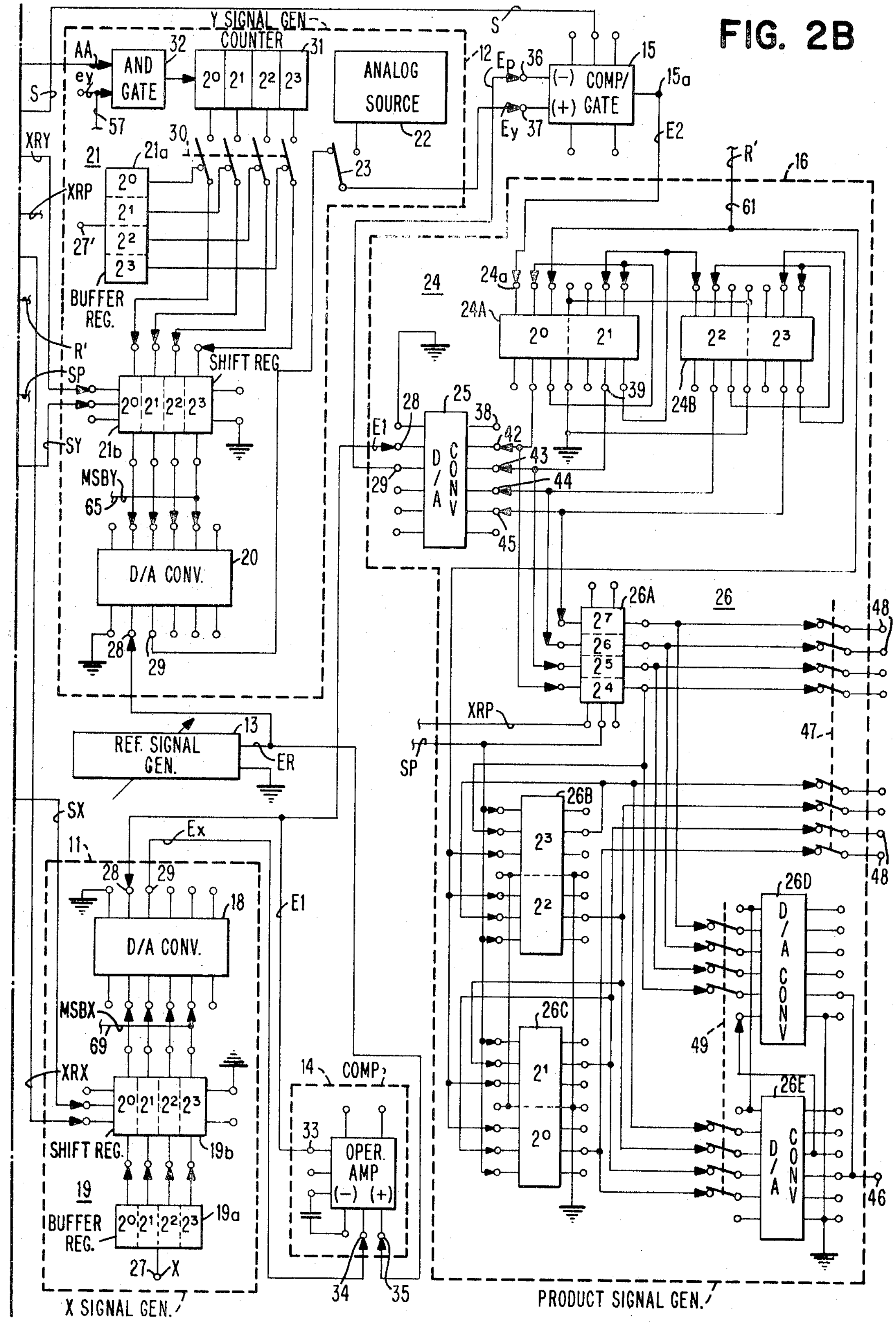

Referring now to FIGS. 2A—2B, the embodiment of FIG. 1 will now be described in greater detail. In order to simplify the explanation, each of the blocks 11, 12 and 14—17 of FIGS. 1, 2A—2B will be described under appropriate headings.

Generator 11

Signal generator 11 includes the aforementioned D/A converter 18 and signal source 19, c.f. FIG. 1. The signal source 19 includes an input or buffer register **19*a* and shift register 19*b*, the latter being the aforementioned X register. For sake of simplicity, in the embodiment of FIGS. 2A—2B a four bit binary signal example is selected to demonstrate the principles of the present invention. Accordingly, registers 19*a* and 19*b*** each have four stages designated $2^0$, $2^1$, $2^2$, $2^3$, respectively.

Initially the digital information representing the quantity X to be multiplied is stored in the register **19*a*. Register 19*a* has appropriate input means schematically represented in the drawing by terminal 27 which is provided for entering the information corresponding to the quantity X into register 19*a*. For the given four bit signal example, X may be any number from 1 to 15. A control signal XRX provided by the control means 17 transfers the digital information from register 19*a* into the shift register 19*b*. The output signal MSBX obtained from the most significant, i.e., high order, stage $2^3$ of register 19*b* is sampled by the control means 17 to determine if a binary 1 exists in that position. If there is no binary 1 present in that position, as explained hereinafter in greater detail, the control means 17 generates a control signal SX that shifts the information in register 19*b* one bit in the high order direction and the sampling process is repeated. The shifting and sampling cycle is repeated until a binary 1 is placed in the most significant position $2^3$ of register 19*b*. Thus, for X = decimal 1, the binary 1 bit is in the $2^0$ position and hence control means 17 generates three shift signals SX to shift the binary 1 bit to the $2^3$ position of 19*b*. For the decimal number 2 or 3 the most significant bit is in the $2^1$ position and for each of the numbers 2, 3 two shift signals SX are required to shift the most significant bit to the $2^3$ position of register 19*b*. For the number 4, 5, 6 or 7 the most significant bit is in the $2^2$ position and hence only one shift signal SX is required to shift the bit to the $2^3$ position. For any of the numbers 8 to 15, the most significant bit is already in the $2^3$ position and consequently 0 or no shift signals SX are generated by the control means 17. Shift registers 19*b*** are well known in the art and, for example, one particular commercially available type suitable for this application is a circuit module type referred to by the manufacturer as the SN 5495.

After the digital information representing the X quantity has been transferred into the shift register **19*b* from register 19*a* and the aforementioned shifting provided, if required, has been performed, the register 19*b* for the given four bit signal example will be in one of the eight possible binary states; namely, 1000, 1001,—1111 which correspond to the decimal numbers 8 to 15, respectively. By way of explanation, a voltage applied to the analogue input terminal 28 of D/A converter 18 is converted at the analogue output terminal 29 to an analogue level indicative of the particular one of the binary numbers corresponding to decimal numbers 8 to 15. For example, assuming a reference voltage el having a fixed or constant level applied to terminal 28, the resultant output signals at terminal 29 would have the values 0.5000el, 0.5625el, 0.6250el, 0.6875el, 0.7500el, 0.8125el, 0.8750el, 0.9375el for the respective binary numbers corresponding to the decimal numbers 8 to 15, respectively. D/A converters of these types are well known in the art and, for example, a commercially available circuit module referred to by the manufacturer as the DAC 100 may be employed for this purpose. In the present invention, the level of signal El, which is applied to terminal 28 of D/A converter 18, adjusts such that Ex = Er in a manner hereinafter explained in greater detail with respect to the description of the comparator 14**.

Generator 12

In the preferred embodiment, a signal generator 12 generates an analogue signal Ey representing the other quantity Y to be multiplied. This analogue signal Ey may be derived from a digital source 21 or alternatively from an analogue source 22 a as aforementioned. In the latter case, the arm of switch 23 is placed in a closed position, not shown, which connects the output of the analogue source 22 directly to an input of the comparator/gate combination circuit means 15. However, with the switch 23 in the illustrated closed position, the output 29 of the D/A converter 20 is connected to the last-mentioned input of circuit means 15. D/A converter 20 may be of the same type as that utilized for D/A converter 18. Its analogue input terminal 28 is referenced by the analogue reference signal Er provided by the adjustable reference signal generator 13. The digital source 21, which is similar to source 19, has a buffer register **21*a* and a shift register 21*b*, each of which has an identical number os stages and which for the given four bit signal example is four stages apiece designated $2^0$, $2^1$, $2^2$, $2^3$, respectively. The output terminals of register 21*a* are connected via switching means 30**, illustrated by way of example only as commonly ganged mechanical contact switches, to the corresponding respective inputs of shift register $21b$, the latter being the aforementioned Y register. Register $21a$ has appropriate input means schematically represented in the drawing by terminal 27' which is provided for entering the information corresponding to the quantity Y into register $21a$. With the switches 23 and 30 in the illustrated closed positions, a control signal XRY, which is provided by the control means 17, transfers the digital information from register $21a$ into the shift register $21b$. The output signal MSBY of the most significant stage $2^3$ of register $21b$ is sampled by the control means 17 to determine if a binary 1 exists in that position. If there is no binary 1 present in that position, the control means 17 generates a shift signal SY that shifts the information in register $21b$ one bit in the high order direction and the sampling is repeated. This cycle is repeated until a binary 1 is placed in the most significant position $2^3$ of register $21b$. Shift register $21b$ may be of the type similar to that employed for the shift register $19b$.

Similar to the operation of the digital source 19 of generator 12, after the Y digital information has been transferred into the shift register $21b$ from register $21a$ and the aforementioned shifting process, if required, has been performed, the register $21b$ will be for the given four bit signal example in one of eight possible binary states 1000—1111 representing the decimal numbers 8 to 15, respectively. As a result, the reference signal voltage Er applied to the analogue input terminal 28 is converted at the output terminal 29 to an analogue level indicative of the particular one of the binary numbers corresponding to the decimal numbers 8 to 15. Thus, for the binary numbers corresponding to decimal numbers 8 to 15, the output analogue voltage Ey at terminal 29 of D/A converter 20 has the following values 0.5000Er, 0.5625Er, 0.6250Er, 0.6875Er, 0.7500Er, 0.8125Er, 0.8750Er, 0.9375Er, respectively.

Alternatively, the Y quantity may be an analogue pulse signal Ey whose width or duration is proportional to the quantity Y to be multiplied. Under these conditions, the switch 30 is placed in a closed position with the outputs of the counter 31 so as to connect these outputs to the corresponding inputs of the shift register $21b$. A recurring basic clock pulse signal AA is applied to one input of the AND gate 32. When the analogue pulse signal Ey is applied to the other input terminal of gate 32, the resultant output pulses derived from each applied pulse of the clock signal AA advances the counter 31, shown schematically in block form for sake of simplicity and which for the given four bit signal example is comprised of four stages designated $2^0$ to $2^3$, respectively. When the analogue signal Ey terminates, the counter 31 will thus contain digital information of the Y quantity to be multiplied. This information is thereafter transferred by the signal XRY into the shift register $21b$ where the most significant bit, if required, is transferred to the most significant bit position of register $21b$ in the manner previously explained.

Alternatively, as aforementioned, the analogue source 22 may provide the analogue signal Ey directly.

Comparator 14

Comparator 14 of the preferred embodiment is preferably an operational amplifier. For example, one such commercially available integrated circuit module type suitable for this purpose is referred to by the manufacturer as the LM101. Comparator 14 is of the type which provides an output analogue signal having an output level proportional to the difference in the respective magnitudes of the input signals which it is comparing. The output 33 of the operational amplifier is coupled to the analogue input terminal 28 of the D/A converter 18 of generator 11. The particular operational amplifier has a pair of inputs 34, 35 referred to in the art as the inverting and noninverting inputs, respectively, and parenthetically designated in the drawing by their conventional negative and positive symbols, respectively. The input 34 is connected to the output terminal 29 of D/A converter 18. The other input 35 is connected to the output of the reference signal generator 13.

The comparator 14 and the D/A converter 18 are configured in a feedback-type arrangement. More specifically, D/A converter 18 provides a feedback path between the output 33 and input 34 of comparator 14. With the provided feedback path and for the fixed level reference signal Er applied to terminal 35, comparator 14 automatically adjusts the level of signal El until the level of signal Ex equals the level of signal Er. As is well known to those skilled in the art, this results from the inherent characteristic of the comparator 14 to stabilize itself, that is, place itself in a state of equilibrium, through the feedback path and which occurs when the signal levels at its inputs are balanced, i.e., Ex = Er. It should be understood that with the binary 1 bit in the highest order stage $2^3$ of register $19b$ and for the given four bit signal example, signal El when adjusted will be in one of eight possible quiescent levels when signal Ex = Er. These eight possible quiescent levels are associated, of course, with the eight possible binary conditioning signals stored in register $19b$ that correspond to the decimal numbers 8 to 15, respectively.

In accordance with the principles of the present invention, when the binary conditioning signals from register $19b$ to D/A converter 18 correspond to the higher order numbers, which for the given four bit signal example are 8 to 15, the comparator 14 operates in the linear portion or region of its operating characteristic. Moreover, the voltage level of signal Er is judiciously selected so that when the binary conditioning signals correspond to the low order numbers, which for the given four bit signal example are 1 to 7, or corresponds to a 0 comparator 14 operates in the nonlinear portion of its operating characteristic. Under these latter circumstances, the signal El is at a saturated level. However, as a result of the aforedescribed shifting of the low order numbers to their corresponding higher order numbers in the register $19b$ as contemplated by the present invention, both the low and high order numbers are processed in the same linear portion. Consequently, the resolution is improved in the present invention than otherwise would be the case if no shifting were performed and the low order and high order numbers had to be processed in two different portions of the linear region. Thus for a given linear portion, more information can be processed and at a greater resolution by the present invention, than in a comparable linear region in the aforementioned case where no shifting is performed. In operation, when a new set of binary conditioning signals are applied to the D/A converter 18, if the number corresponding to the new set is different from the number corresponding to the set being replaced, the signal level of signal Ex changes causing a concomitant change in the difference between the levels of signals Ex and Er thereby changing the level of signal El. As a result of the change in the level of signal El, the level of signal Ex is further changed and results in further change in the level of signal El. Thus, the level of signal El continues to change until the output signal Ex is equal to the level of the reference signal Er at which time the comparator 14 is placed in a balanced condition. When this occurs, the level of the output signal El is indicative of the binary number contained in the shift register $19b$ and as will become apparent hereinafter to the quantity X. The signal El is also fed to the product signal generator 16 where it is further processed in the manner hereinafter described.

Circuit Means 15

The combination circuit 15 includes a comparator and a gate circuit for gating the output of the particular comparator. The comparator of circuit 15 of the preferred embodiment is preferably an operational amplifier. Combination circuits employing an amplifier and gate of the aforedescribed type are well known in the art. For example, one such commercially available integrated circuit module type suitable for this purpose is referred to by the manufacturer as the LM106. The comparator of circuit 15 is of the type which compares two signals and supplies an indication of agreement or disagreement and sometimes referred to in the art as an add-or-subtract circuit. The comparator of circuit 15 has a pair of inputs 36, 37 referred to in the art as the inverting and noninverting inputs, respectively. Input 36 is connected to an output, hereinafter described, of the product signal generator 16. Input 37 is connected to the output of the signal generator 12 at which the signal Ey appears. Control means 17 provides a gate signal S for periodically gating the output 15*a* of circuit 15 to an input, hereinafter described, of product signal generator 16.

Generator 16

As aforementioned, product signal generator 16 includes a counter 24, D/A converter 25, and an output means generally indicated by the reference number 26. The D/A converter 25 may be of the same type as that used for the D/A converter 18 or 20 of respective generators 11 and 12. The analogue input terminal 28 of D/A converter 25 is connected to the output terminal 33 of comparator 14 which provides the analogue output signal El thereat. The analogue output signal Ep of the D/A converter is provided at the analogue output terminal 29 of D/A converter 25 which is connected to the aforementioned input terminal 36 of the comparator of circuit 15.

For the four signal bit example, the counter 24 has four stages designated $2^0$, $2^1$, $2^2$, $2^3$, respectively. By way of example the counter 24 may be configured with two commercially available integrated circuit modules 24A, 24B, each of which is of the type referred to by the manufacturer as the SN 5474. Briefly, each of the modules 24A, 24B contains a pair of identical flip-flop circuits. In the counter 24 each flip-flop comprises one of the stages of the counter 24 and these stages are appropriately interconnected for this purpose in a manner obvious to those skilled in the art. The output 15*a* of circuit 15 is connected to the input terminal 24*a* of the low order stage $2^0$ of counter 24. The output terminals 38—41 of the stages $2^0$ to $2^3$, respectively, of counter 24 are connected to the corresponding binary input terminals 42—45 of the D/A converter 25.

In operation, when the operational amplifier 14 is in the balanced condition and its resultant output signal El is fed to the terminal 28 of the D/A converter 25, the signal El will be converted to the signal Ep. The level of signal Ep is proportional to the binary number contained in the counter 24. Initially, the counter 24 is reset by a reset signal R' provided by the control means 17 to the zero binary state. During the period when the signals S are applied to the gate circuit 15, the output signal E2 of the comparator of circuit 15 is fed to the input 24*a* of counter 24. If the signal level of signal Ep is less than the level of signal Ey, the output signal E2 will be a predetermined fixed level. As a result, the temporary closing of the output gate of circuit 15 by a gate signal S, causes the signal E2 to appear as a pulse signal at the input terminal 24*a* of the first stage $2^0$ of counter 24. As a result, the binary number which is equivalent to a decimal 1 is placed in the counter 24. The resultant binary output signals of counter 24 in turn cause the level of the output signal Ep appearing at terminal 29 of D/A converter 25 to change accordingly. If the changed level of the signal Ep still remains below the level of signal Ey then the output signal E2, when the gate of circuit 15 is next closed, will advance the counter 24 to the next binary number corresponding to the decimal number 2. This cycle repeats until such time when the binary output signals of the counter 24 cause the level of the signal Ep generated at the output 29 of D/A converter 25 to be equal to or greater than the level of signal Ey at which time the comparator circuit 15 is placed in a balanced condition and the signal E2 terminates, i.e., goes from its aforementioned predetermined fixed level to its zero or null level. Consequently, when subsequently applied gate signals S are applied to the gate of circuit 15 the output level of signal E2 is insufficient to advance the counter 24.

The output means 26 of generator 16 includes a shift register 26A—26C which for the given four bit signal example has twice the number of stages designated as stages $2^0$ to $2^7$, respectively. More specifically, as shown in FIG. 2B the outputs 38—41 of the counter 24 are also connected to the input terminals of higher order stages $2^4$ to $2^7$ stages, respectively, of the register 26A—26C, which is the aforementioned product register of generator 16. Control means 17 generates a control signal XRP after the counter 24 has stopped counting which transfers the binary number in counter 24 to the aforementioned higher order stages $2^4$ to $2^7$ of the shift register 26A—26C. Control means 17 thereafter generates a signal SP which shifts the information in the register 26A—26C from the high order direction to the low order direction a number of times equal to the number of shifts, if any, provided for the shift register 19*b* of generator 11 as well as the number of shifts, if any, provided for the shift register 21*b* of generator 12 during the particular multiplication operation being performed for the particular quantities X and Y. As a result, the binary number contained in the shift register 26A—26C is approximately equal to the product of the quantities X and Y. By way of example, the higher order stages $2^4$ to $2^7$ of the register 26A—26C may be configured in a commercially available integrated circuit module 26A which is of the same type utilized for the register 19*b* or 21*b*. Likewise, the lower order stages $2^0$ to $2^3$ may be configured, for example, in two identical commercially available type circuit modules 26B and 26C, each of which may be the same as the module 24A or 24B of the counter 24.

The output terminals of the respective stages $2^0$ to $2^7$ of register 26A—26C provide the product information directly in digital form and/or may be also coupled to the input of a D/A converter 26D—26E which converts the digital output signals of the register 26A—26C to an equivalent analogue output signal at terminal 46. The D/A converter modules 26D, 26E may be of the same type provided for the D/A converter 18, 20, or 25 and are interconnected in a manner obvious to those skilled in the art to provide the equivalent analogue output signal at terminal 46. Switching means 47 may be provided to couple the output signals of the stages $2^0$ to $2^7$ of register 26A—26C to the respective output terminals 48 so as to provide the digital output signal thereat. Also a switching means 49 may be provided for selectively coupling the outputs of the stages $2^0$ to $2^7$ of register 26A—26C to the respective corresponding inputs of the D/A converter 26D—26E so that the aforementioned analogue output signal may be provided at the terminal 46. Thus with the switches 47 and 49 in their respective illustrated closed positions, the signal product generator 16 generates both the digital and analogue signals of the product of the quantities X and Y. Alternatively, if it is desired to have the output signal exclusively as a digital signal, switch 47 is placed in the closed position and switching means 49 is placed in an open position, and vice versa where it is desired to have the analogue output signal exclusively.

Control Means 17

Referring now to FIG. 2A, control means 17 includes a clock 50 which provides the basic clock signals for the multiplier circuit apparatus 10. Clock 50 includes a counter 51 and an oscillator 52 which provides a recurring periodic signal having a periodicity *t* for operating the counter 51, c.f. waveform of the output pulse signal of oscillator 52 shown in FIGS. 3A—3B. For the particular illustrated embodiment, counter 51 has seven binary stages designated $2^0$ to $2^6$, respectively. The counter 51 may be configured with identical dual, i.e., twin, circuit modules 51A—51D and each of which modules may be of the same type as employed for the module 24A, 24B, 26B, or 26C. The stages $2^0$ to $2^6$ of counter 51 are interconnected in a manner obvious to those skilled in the art and in response to the triggering pulses of oscillator 52, which are applied to the input terminal 51*a* of the low order stage $2^0$ of counter 51, the output signals AA, BB, CC,—GG are provided at the respective 1 output terminals of the stages $2^0$ to $2^6$, respectively, cf. waveforms AA— GG, FIGS. 3A—3B.

Control means 17 also includes suitable logic circuitry 53 responsive to the clock signals AA—GG and certain of their NOT counterparts, as well as the signals MSBX, MSBY, and signal Ey, so as to provide the aforementioned control signals XRX, XRY, XRP, SX, SY, SP, S, and R′ in a predetermined sequence during the basic operating cycle period *T*. Signals AA—GG, inclusive, as ANDed by the AND gate 54. AND gate 55 ANDs the output of AND gate 54 with the output of the inverter 56. The input of inverter 56 is connected via conductor 57 to the input terminal of generator 12 to which the analogue pulse signals Ey are fed. In the absence of a signal Ey, the output of the inverter 56 is in its UP position and consequently the AND gate 55 in response to the output of AND gate 54 generates the signal XRY, c.f. waveform XRY, FIGS. 3A—3B. It should be noted that at the beginning of each period T all the binary related output signals AA—GG are in their UP position, cf. FIGS. 3A—3B. Oscillator 52 generates pulse signals having a periodicity *t* as aforementioned. Accordingly, the periodicities of the signals AA—GG are *2t*, *4t*, *8t*, *16t*, *32t*, *64t*, and *128t*, respectively, and the period *T* 32 *128t*. Under these conditions, the signal XRY appears only at the commencement of each period *T*, that is to say during the period *Txy*. The output of AND gate 54 also provides the signal XRX, cf. waveform XRX, FIGS. 3A—3B, and it too is likewise generated only at the commencement of the period *T*, i.e., during the period *Txy*. If and when a signal Ey is present at the particular input terminal of AND gate 32, the resultant output signal of inverter 56 inhibits the operation of AND gate 55. Inverter 46 thus prevents any premature transfer of the digital information from the Y register **21*b* into the D/A converter 20 while during the application of signal Ey counter 31** is being advanced by the signals AA to the proper binary number corresponding to the analogue equivalent of the quantity represented by the pulse width of the signal Ey.

ANd gate 58 AND s the signals AA, GG, and the NOT counterpart signal $\overline{FF}$. Thus during the period Ts, the sampling signals S, cf. waveform S, FIGS. 3A—3B, are generated at the output of AND gate 58.

Figure 3A:
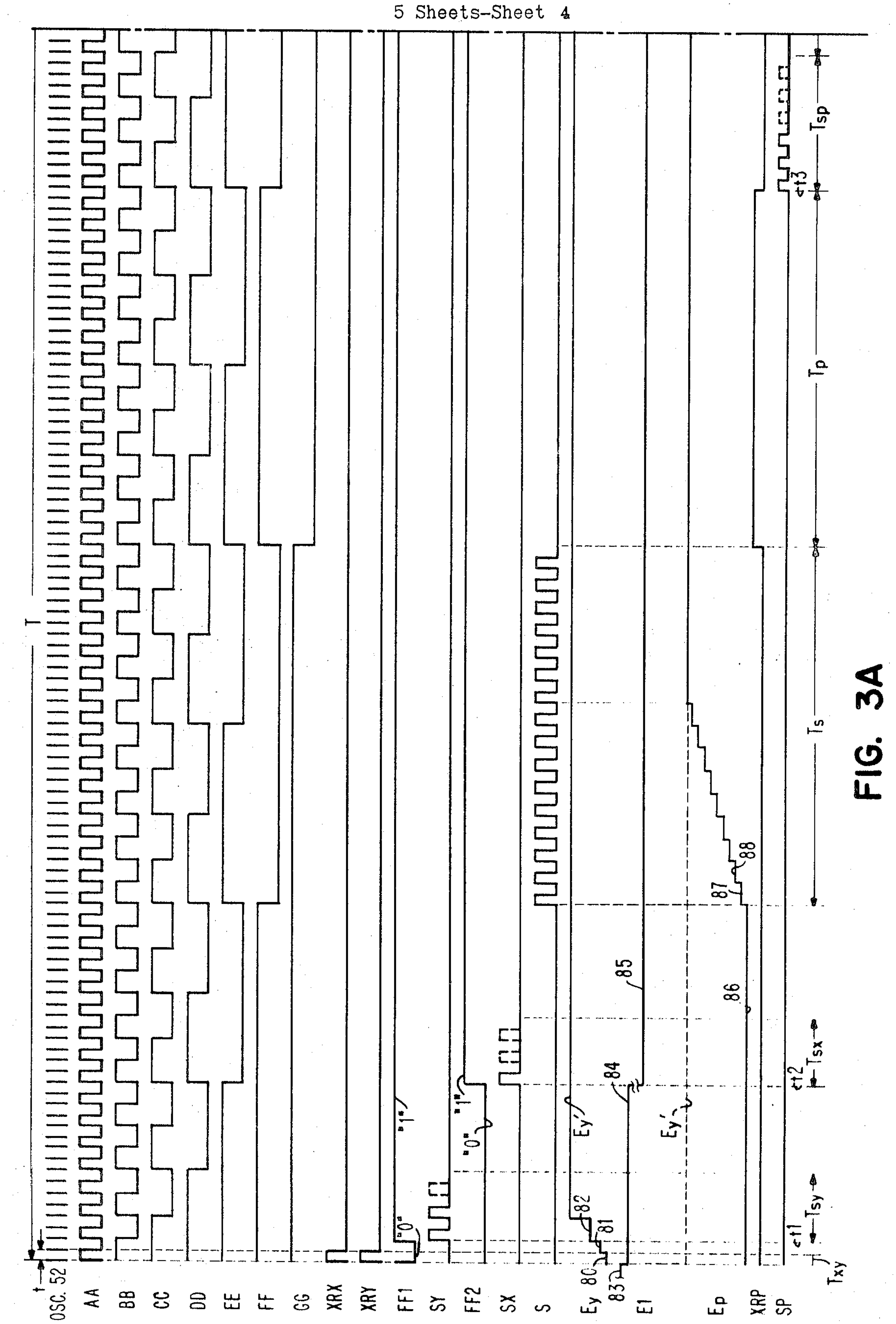
FIGS. 3A—3B are idealized waveforms for various signals utilized in the apparatus of FIGS. 1, 2A—2B.
Figures 3B, 6:
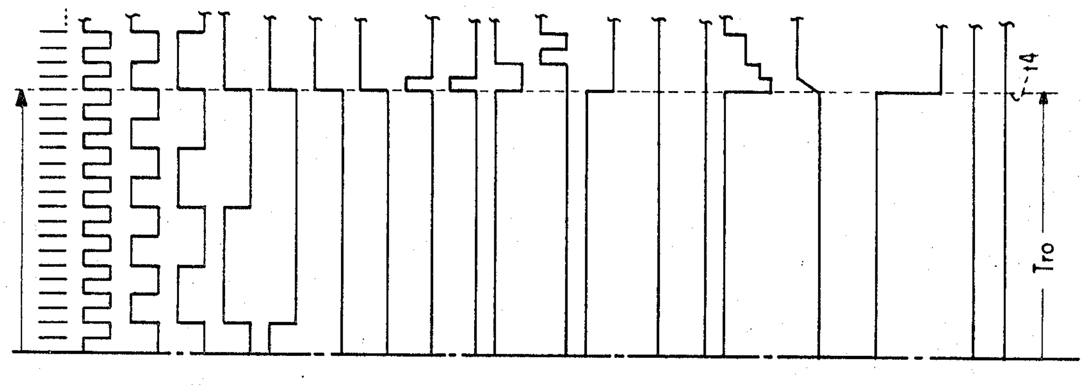
FIG. 6 is a table helpful in understanding the principles of the present invention.

AND gate 59 ANDs the inputs of signals FF and the NOT counterpart signal $\overline{GG}$ and provides at its output the signal XRP during the time interval Tp, cf. waveform XRP, FIGS. 3A—3B.

The output of AND gate 54 is inverted by an inverter 60 which generates the reset signal R′ which is fed via conductor 61 to the respective reset input terminals of the counter 24 and the register 26A—26C of generator 16. AND gate 62 ANDs the signal AA, the NOT counterpart signals $\overline{GG}$ and $\overline{FF}$ with the output of an OR gate 63. The output of AND gate 62 provides the signal SP which is used to shift the information in the register 26A—26C during the time period *tsp*. cf. waveform Sp, FIGS. 3A—3B.

Inverter 64 inverts the signal MSBY being fed from stage $2^3$ of shift register **21*b* via conductor 65 to its NOT counterpart $\overline{MSBY}$. AND gate 66 ANDs the signal AA, the NOT counterpart $\overline{MSBY}$ with the output of the multivibrator or flip-flop circuit 67A, hereinafter described. The output of AND gate 66** provides the control signal SY during the period Tsy, cf. waveform SY, FIGS. 3A—3B.

Inverter 68 inverts the signal MSBX being fed via conductor 69 from the output of stage $2^3$ of register **19*b* to its NOT counterpart $\overline{MSBX}$. AND gate 70 ANDs the signal AA, NOT counterpart signal $\overline{MSBX}$, and the output of the flip-flop circuit 67B hereinafter described in greater detail. The output of AND gate 70** provides the control signal SX during the period *Tsx*, cf. waveforms SX, FIGS. 3A—3B.

Flip-flop circuit 67A has a reset input, **67*a*, a set input 67*b*, and an output 67*c*. At the commencement of each period T, the signal XRX from the output of AND gate 54 resets the output 67*c*, cf. waveform FF1, FIGS. 3A—3B, of flip-flop 67A to a binary zero level 0** during the period T *Txy* where it remains until time *t*1. At time *t*1, the first NOT counterpart pulse of signal $\overline{BB}$ appears coincidentally with the second pulse of signal AA. These last-mentioned pulses are ANDed by AND gate 71 which provides an input signal to the input **67*b* which sets the output 67*c* to the binary one 1** state, cf. waveform FF1, FIGS. 3A—3B, at which it remains until the next signal XRX appears at the commencement of the next succeeding period *T*. While the flip-flop 67A is in the binary zero output state, it inhibits the premature generation of any shifting pulses SY by AND gate 66 which might otherwise occur if there is no binary 1 bit in stage $2^3$ of register **21*b*** during the time interval beginning with the commencement of the period *T* and which terminates at time *t*1.

Likewise, flip-flop circuit 67B has reset input **67*a′*, a set input 67*b′*, and an output 67*c′***. At the commencement of each period *T*, flip-flop 67B is reset to a binary zero output state 0 by the signal XRX applied to its input **67*a′*, cf. waveform FF2, FIGS. 3A—3B. It remains in the binary 0 output state at its output 67*c′*** until time *t*2. At time *t*2, the NOT counterpart signal $\overline{EE}$ appears and it is ANDed by AND gate 72 with the signal at output **67*c* of flip-flop 67A, which at this time is in the binary one level 1. As a result, the output of gate 72 sets the output 67*c′* of flip-flop 67B to binary one level 1**, cf. waveform FF2, FIGS. 3A—3B at which it remains until the next signal XRX appears at the commencement of the next succeeding period *T*. While flip-flop 67B is in the binary zero output state, it inhibits the premature generation of any shifting pulses SX by AND gate 70 which might otherwise occur if there is no binary 1 bit in stage $2^3$ of register **19*b*** during the time interval beginning with the commencement of period *T* and which terminates at time *t*2.

The flip-flop circuits 67A, 67B, for example, each may be one of the dual flip-flop circuits contained in the same integrated circuit module which is of the same type as used for the module 24A, 24B, 26B, 26C, 51A, 51B, 51C, or 51D.

Logic circuit 53 also includes an UP/DOWN counter 73 which keeps track of the number of times, if any, the X and Y registers **19*b*, 21*b* are shifted in a particular multiplication operation and uses this information to shift the product register 26A—26C in formulating the product of the particular X and Y quantities being multiplied. More specifically, OR gate 74 ORs the signals SX, SY, and SP. Initially, the counter 73 is reset to a zero output condition by the output signal XRX of AND gate 54 via inverter 75** at the commencement of the period *T*. Thereafter for each pulse, if any, of signals SY and SC SX which appear at the appropriate inputs of OR gate 74, the latter provides an output signal which advances the gate in the forward direction to the next count. For the given four bit signal example, each of the registers **19*b* and 21*b* is capable of being shifted a maximum of three times. Consequently, the UP/DOWN counter 73 need provide only a sufficient number of stages required to store the binary number equivalent to the decimal number 6. By way of example, the counter 73 may be configured as a commercially available module referred to by the manufacturer as the S8284. As shown in FIG. 2B, counter 73 has its four binary outputs designated $2^0$, $2^1$, $2^2$, $2^3$, for the aforementioned circuit module type S8284 coupled to the four inputs of OR gate 63**.

AND gate 76 ANDs the NOT signals $\overline{FF}$ and $\overline{GG}$. It provides a conditioning signal to the input 77 of counter 73. During the interval *t*3—*t*4, cf. FIGS. 3A—3B, signals $\overline{FF}$ and $\overline{GG}$ are simultaneously in their respective UP levels. As a consequence, the output of the AND gate 76 is also at an UP level during the interval *t*3—*t*4 of the period *T*. At all other times during the period T the output AND gate 76 is at its DOWN level. With the output of AND gate 76 in the DOWN level, it conditions counter 73 to count in the forward or up direction and consequently the counter 73 will count in the forward direction if pulses SY and SX are present during the periods *Tsy* and *Tsx*, respectively. On the otherhand, if the output of AND gate 76 is in the UP level, it conditions counter 73 to count in the reverse direction and consequently the counter 73 will count in the reverse direction if pulses SP are present during the period Tsp which is concurrent with the interval *t*3-—*t*4, cf. FIGS. 3A—3B.

For sake of clarity, the biasing, i.e., power, supplies and the connections thereto for the various circuits and modules, illustrated in FIG. 2B have been omitted. It should be understood, however, that appropriate biasing supplies, not shown, are provided and connected to the appropriate circuit inputs in a manner obvious to those skilled in the art. The NOT counterpart signals utilized by the logic circuitry 53 are provided by the respective 0 output terminals of the appropriate stages of counter 51. The operation of the circuit of FIGS. 2A—2B will next be described.

Operation

Referring now to FIGS. 2A—2B, 3A—3B, and 6, for purposes of explanation it will be assumed that the switches 23, 30, 47, and 49 are in the illustrated closed positions. For the illustrated closed positions of switches 23 and 30 the Y quantity to be multiplied is inserted at the input terminal 27' of the buffer register **21*a* thereby storing the Y quantity as digital information in the buffer register 21*a*. With the switches 47 and 49 in the illustrated closed positions the product quantity is made available both as a digital signal at the output terminals 48 and an analogue signal at the output terminal 46**.

For purposes of explanation it will be further assumed that the Y quantity to be multiplied is a binary number 0011 and the X quantity is a binary number 0111 corresponding to the decimal numbers 3 and 7, respectively. For this assumed case the true product of the quantities X and Y is equivalent to the decimal number 21.

Prior to the time *T* in which the multiplication operation is to be performed, the digital numbers corresponding to the quantities X and Y are stored in their respective buffer registers **19*a* and 21*a*, respectively. It will also be assumed that prior to time T, no digital information is stored in the registers 19*b* 21*b* such as might be the situation when power to apparatus 10 is first turned on. Under these circumstances, the outputs of registers 19*b*, 21*b* are each in binary 0000 conditions. For the assumed conditions, signal E1 is at a saturation level which the D/A converter 18 transforms to the signal Ex = 0 for the binary conditioning signal 0000 of register 19*b*. For the biasing conditioning signal 0000 provided by register 21*b*, D/A converter 20** converts the signal Ey to the signal Ey to a null or zero level.

At the commencement of time period *T*, the pulse signals XRY and XRX are generated by the control means 17 causing the information in registers **19*a* and 21*a* to be transferred to the shift registers 19*b* and 21*b*, respectively. As a result the binary bits 0, 1, 1, 1 are stored in the stages $2^3$, $2^2$, $2^1$, and $2^0$ of register 19*b* for the given X quantity of a decimal number 7. Similarly, the binary bits 0, 0, 1, 1 are stored in the stages $2^3$, $2^2$, $2^1$, and $2^0$, respectively, of shift register 21*b* for the given Y quantity of a decimal 3**.

At time *t1* since a binary 0 appears in the stage $2^3$ of register **21*b* the signal MSBY is at a zero level. Signal MSBY, when inverted by the inverter 64, conditions AND gate 66 so that the second pulse of signal AA appearing at the input of AND gate 66** causes the first pulse of signal SY to be generated at its output. It should so understood, as previously explained, that at a time *t1* the output **67*c* of flip-flop 67A is switched to a binary 1 level due to the presence of the second pulse of signal AA and the first pulse, not shown, of NOT signal $\overline{BB}$ at the output of AND gate 71. Accordingly, output 67*c* is at the appropriate level for conditioning the AND gate 66** at time *t1*. The first pulse of signal SY causes the digital information stored in the register **21*b* to shift in the high order direction so that the binary bits 0, 1, 1, 0 appear in the stages $2^3$, $2^2$, $2^1$, and $2^0$ of register 21*b*. It should be noted that the digital information in register 21*b* now corresponds to a decimal number 6**.

Under these conditions a binary 1 bit is still not present in the stage $2^3$ of shift register **21*b*. Accordingly, the signal MSBY is still in its zero level and consequently the third pulse of signal AA causes the AND gate 66 to generate the second pulse of signal SY. The second pulse of signal SY again causes the digital information in the shift register 21*b* to shift in the high order direction. As a result the binary bits 1, 1, 0, 0 are located in the stages $2^3$, $2^2$, $2^1$, and $2^0$ of register 21*b*. When this occurs the signal MSBY is now at a 1 level and when inverted by the inverter 64 disables the AND gate 66 so that subsequent pulses of the signal AA do not provide further pulses of the signal SY by the AND gate 66**.

In accordance with the principles of the present invention, each of the low order numbers, the aforementioned number 1 to 7 for the given four bit signals example, is shifted in the Y register **21*b* in the high order direction to its corresponding highest order binary related number capable of being stored in the register 21*b*. Thus, for the assumed case where the Y quantity to be multiplied corresponds to a binary 0011 = decimal 3, it is shifted in the Y register 21*b* to its corresponding highest order binary related number 1100 = decimal 12 which is capable of being stored in the given four stage example register 21*b*. Here again, as contemplated by the present invention, this allows both the low order and high order Y numbers to be processed in the same linear region of the operating characteristic of the comparator of means 15 thereby providing similar results to those previously described with regards to signal generator 11 and comparator 14**.

For the four stage register **21*b* the maximum number of shifts required to place the binary 1 bit in the stage $2^3$ of register 21*b* occurs when the Y quantity to be multiplied corresponds to a binary number 0001, i.e., decimal 1. In the case of a binary 0001, three pulses of signal SY are generated. For sake of clarity, this third pulse of the signal SY is shown in phantom outline in the waveform SY of FIGS. 3A—3B but it should be understood for the case of the binary 0011** this third pulse is not present.

As shown by the waveform Ey of FIGS. 3A—3B, during the period *Txy* the output signal Ey of D/A converter 20 is transformed from its null level 80 to a level 81. Level 81 is dependent upon the level of reference signal Er and the binary conditioning signals present in the shift register **21*b* which for the given example correspond to the binary number 0011. When the first pulse of signal SY is applied the signal Ey transforms to the level 82. Again level 82 is dependent upon the level of signal Er and the conditioning signals provided by the shift register 21*b*, which as aforementioned are a binary 0110 corresponding to a decimal 6. Likewise, when the second pulse of signal SY is applied the resultant level Ey' of signal Ey is again dependent upon the level of the signal Er and the conditioning signals of register 21*b* which now correspond to a binary 1100 and which is equivalent to a decimal 12. Signals 81, 82 and Ey' are related in a binary manner. That is, level 82 is twice level 81 and level Ey' is twice level 82. Since signal Er is a constant, level Ey' is directly related to the binary number 1100 = decimal 12**.

Just prior the the period *Txy*, signal El is at a saturation level 83 associated with the assumed set of binary conditioning signals 0000 of register **19*b***. During the period *Txy*, as a result of the binary conditioning signals of register **19*b* being changed to the given X case of a binary 0111, signal El goes from the level 83 to a quiescent saturation level 84 which is indicative of the binary number 0111. For sake of simplicity, the negligible transient portions of the idealized waveforms illustrated in FIGS. 3A—3B have been omitted and consequently the transient portion of the waveform El between levels 83 and 84** are not shown.

At time *t2*, signal FF 2 switches from its binary 0 level to its binary 1 level for the reasons previously explained. For the given case of X = binary 0111, its most significant bit is a zero and located in stage $2^3$ of register **19*b***. Consequently, the pulse of signal AA which commences at time *t2* causes AND gate 70, which is also conditioned at this time by the 1 levels of NOT signal $\overline{MSBX}$ and the output of **67*c'* of flip-flop circuit 67B, to generate the first pulse of signal SX, cf. FIGS. 3A—3B. As a consequence, the digital information in register 19*b* is shifted in the upward direction from binary 0111 to binary 1110, which is its highest order binary related number capable of being stored in register 19***b*. With a 1 bit now in the stage 2$^3$ of register 19*b*, the NOT counterpart signal MSBX now disables AND gate 70 and no further pulses of signal SX are provided. For sake of clarity, however, there is shown in phantom outline the two additional pulses of signal SX so as to represent the the maximum number of shifts, i.e., three, required to place the binary 1 bit in the highest order stage 2$^3$ of the four stage register 19*b* example when the X quantity to be multiplied corresponds to a decimal 1.

Signal E1, as a result of the pulse of signal SX being generated, goes from its previous level 84 to a quiescent level 85 which is indicative of the binary number 1110 = decimal 14.

At the commencement of time period *T*, signal R′ is generated by inverter 60 which clears counter 24 and register 26A—26C as previously explained. As a result, signal Ep of D/A converter 25 will be at its zero or null value 86 due to the binary conditioning signals of counter 24 being a binary 0000.

During the period Ts, signal S is generated by AND gate 58. During this period Ts, signal GG and the NOT signal $\overline{FF}$ are in their respective 1 levels and as a result the 16 pulses of signal AA concurrent in this period Ts cause the AND gate 58 to generate the sixteen pulses of signal S shown in FIGS. 3A—3B. The first pulse of signal S closes the gate of means 15 and advances counter 24 to a binary 0001. The new binary signal 0001 causes a concomitant change in the signal Ep from its null level 86 to the level 87. The second pulse of signal S again closes the gate and causes counter 24 to change to a binary 0010. Signal Ep changes accordingly from level 87 to level 88. As will be explained hereinafter with the aid of the table of FIG. 6 for the particular chosen quantities X = 7 and Y = 3, the counter 24 continues to advance in this manner until it is advanced to a binary 1010. When this occurs, the signal up is at a level equal to or greater than the level Ey′. As a result, the level of the output of the comparator of means 15 goes to a null level which is ineffective to advance the counter 24 each time the remaining pulses of signal S close the gate circuit of means 15.

It should be noted that the UP/DOWN counter 73 has stored in it the digital information corresponding to the number of shifts which occur in the X and Y registers 19*b* and 21*b* in the manner previously explained. For the assumed case of X = 7 and Y = 3, the digital information is a binary 0011 = decimal 3 corresponding to the one shift provided in the X register and the two shifts provided in the Y register which advance the counter 73 in the forward direction via OR gate 74.

During the interval *Tp*, signal XRP is generated by signal FF and NOT signal $\overline{GG}$ via AND gate 59. The digital information in the stages 2$^3$ to 2$^1$ of counter 24 is placed in the register 26A—26C. Commencing at time *t*3 and during the period *Tsp*, AND gate 62 generates the required number of pulses of signal SP that shift the numbers in the register 26A—26C in the downward direction, the counter 73 being conditioned by the NOT signals $\overline{FF}$, $\overline{GG}$ via AND gate 76 to count in its reverse direction as was also previously explained. For the assumed case, AND gate 62 generates three pulses for signal SP, the gate 72 becoming disabled when the counter 73 is returned to a binary 0000 condition by the three pulses of signal SP.

During the time period *Tro*, the information in register 26A—26C which is related to the product of the quantities being multiplied is read out at terminals 48 and/or terminal 46. If desired, switches 47 and/or 49 may be normally open electronic switches which are closed by synchronized gate signals during period *Tro*. If the apparatus 10 is operating on an automatic cycle, the digital information representing the next quantities to be multiplied may be entered in the appropriate buffer registers 19*a* and 21*a*, respectively, during the period *Tro*.

Referring now to FIG. 6 the table therein correlates the true product values TRUE of the high order decimal numbers being multiplied with the actual product values ACT. obtained for the particular four bit signal example and embodiment of FIGS. 2A—2B. For example, in the assumed case of X = 7 and Y = 3, their corresponding high order binary numbers are 14 and 12, respectively. In the table, the low order numbers are shown parenthetically and juxtaposed with their highest order binary related number capable of being stored in the particular X and Y registers. As enumerated in column A there are 36 possible true products that can be obtained by multiplying each of the high order numbers of the X quantities with each of the high order numbers of the Y quantities. For the four signal bit example, the true products of the high order numbers are quantized by the stages of the register 26A—26C into 11 actual products corresponding to the numbers 64, 80, 96,-—208, 224 shown in FIG. 6. Thus, the true product of 12 × 14 is 168 but its actual value is decimal 160 = binary 10100000 when read out of register 26A—26C and resulting in an error of decimal −8. The product of the assumed quantities X = 7 and Y = 3 is binary related to the actual value of the high order product. Thus, after the register 26A—26C is shifted by the pulses of signal SP, digital information in register 26A—26B would be a decimal 20 = a binary 00010100 resulting in the binary related error of a decimal 1. If desired, the quantizing errors can be reduced by increasing the capacity of the apparatus 10 to process larger bit numbers as is obvious to those skilled in the art. The reference level of signal Er is judiciously selected that the counter 24 will count to binary numbers corresponding to 4 to 14 for the actual products 64, 80, 96, 112, 128, 144, 160, 176, 192, 208, 224, respectively.

In the other mode of operation of signal generator 12, where an analogue pulse signal Ey is utilized the overall operation is generally the same as the aforedescribed except that the counter 31 replaces the buffer register 21*a*. In the other mode of operation where the analogue signal Ey is provided directly by source 22 then, of course, no shifting occurs in the generator 12. In this last situation, it can readily be demonstrated that for the true product ranges 1 to 31, 32 to 47, 48 to 63, the actual quantized levels are 16, 32, and 48, respectively, corresponding to decimal counts 1, 2, and 3, respectively, in counter 24. The true product changes for numbers grater than greater than 63 and their associated quantized levels can be obtained with the aid of the table of FIG. 6. Of course, if any shifting occurs in the X shift register 19*b*, the quantized levels are shifted in the low direction in the shift register 26A—26C an equal number of times.

Thus, while the invention has been particularly shown and described with reference to the preferred embodiments, it will be understood by those skilled in the art that the foregoing and other changes in form and detail may be made therein without departing from the spirit and scope of the invention.

I claim:

1. Circuit apparatus for multiplying first and second quantities, said apparatus comprising:

first signal generator means having first multistage shift register means for storing digital information corresponding to said first quantity and first digital-to-analogue converter means having first binary conditioning input means coupled to said first register means, said first converter means further having a first analogue input and a first analogue output;

second signal generator means for providing an analogue signal corresponding to said second quantity;

a reference signal generator for providing an analogue reference signal having a predetermined reference level;

first comparator means having a first pair of inputs and an output, one of the inputs of said first pair being coupled to said reference signal generator, said first converter means having said first analogue input coupled to said output of said first comparator means and said first analogue output coupled to the input of said first comparator means to provide a feedback path for said first comparator means;

second comparator means having a second pair of inputs and an output, one of the inputs of said second pair being responsive to the analogue signal of said second generator means;

third signal generator means comprising:

second digital-to-analogue converter means having second binary conditioning input means, a second analogue input coupled to the output of said first comparator means, and a second analogue output coupled to the other input of said second pair of said second comparator means;

digital conditioning means having output means for conditioning said second binary conditioning input means, said digital conditioning means having an input coupled to the output of said second comparator means; and second multistage shift register means for storing the information of said digital conditioning means therein, said second register means having an input means coupled to the output means of said digital conditioning means; and control means for providing a first control signal for shifting the digital information in said first register means in the upward direction to place the most significant bit of the last-mentioned digital information in the highest order stage of said first register means whenever the last-mentioned digital information stored therein does not have a binary 1 bit in said highest order stage, and said control means providing a second control signal for shifting the information in said second register means in the downward direction in a number of shifts equal to the number of shifts required to shift the digital information in said first register means by said first control signal.

2. Circuit apparatus according to claim 1 wherein said second signal generator means further comprises:

third digital-to-analogue converter means having third binary conditioning input means, a third analogue input coupled to the reference signal generator, and a third analogue output for providing the analogue signal of said second signal generator means thereat; and third multistage shift register means for storing digital information corresponding to said second quantity, said third binary conditioning input means being coupled to said third register means;

said control means further providing a third control signal for shifting the digital information in said third register means in the upward direction to place the most significant bit of the last-mentioned digital information in the highest order stage of said third register means whenever the last-mentioned digital information stored therein does not have a binary one bit in said last-mentioned highest order stage, said second control signal further shifting the information in said second register means in the downward direction a number of shifts equal to the number of shifts required to shift the digital information in said third register means by said third control signal.

3. Circuit apparatus according to claim 2 wherein said second signal generator means further comprises means for converting a pulse width analogue signal corresponding to said second quantity to digital information for storing in said third register means.

4. Circuit apparatus for multiplying first and second quantities, said apparatus comprising:

a first signal generator having a first buffer register for storing digital information corresponding to said first quantity, a first multistage shift register coupled to said first buffer register, and first digital-to-analogue converter having first binary conditioning input means coupled to said first shift register, said first converter having a first analogue input and a first analogue output;

a second signal generator for providing an analogue signal corresponding to said second quantity;

a reference signal generator for providing an analogue reference signal having a predetermined reference level;

a first comparator having a first pair of first and second inputs and an output, said first input of said first pair being coupled to said reference signal generator, said first converter having said first analogue input coupled to the output of said first comparator and said first analogue output coupled to the second input of said first pair to provide a feedback path for said first comparator;

a second comparator having a second pair of first and second inputs and an output, said first input of said second pair being responsive to the analogue signal of said second generator;

a third signal generator comprising:

a second digital-to-analogue having second binary conditioning input means, a second analogue input coupled to the output of said first comparator and a second analogue output coupled to the second input of said second pair;

a digital counter having output means for conditioning said second binary conditioning input means, said digital counter having an input coupled to the output of said second comparator; and a second multistage shift register for storing the information of said digital counter therein, said second shift register having an input means coupled to the output means of said digital counter; and control means for providing a first transfer signal for transferring the information in said first buffer register to said first shift register, a first control signal for shifting the digital information in said first shift register in the upward direction to place the most significant bit of the last-mentioned digital information in the highest order stage of said first register whenever the last-mentioned digital information stored therein does not have a binary one bit in said highest order stage, a second transfer signal for transferring the digital information in said digital counter into said second shift register, and a second control signal for shifting the information in said second shift register in a downward direction a number of shifts equal to the number of shifts required to shift the digital information in said first shift register by said first control signal.

5. Circuit apparatus according to claim 4 wherein said second signal generator further comprises:

a third digital-to-analogue converter having third binary conditioning input means, a third analogue input coupled to the reference signal generator, and a third analogue output for providing the analogue signal of said second signal generator thereat;

a third multistage shift register for storing digital information corresponding to said second quantity, said third binary conditioning input means being coupled to said third shift register; and said control means further providing a third control signal for shifting the digital information in said third shift register in the upward direction to place the most significant bit of the last-mentioned digital information in the highest order stage of said third shift register whenever the last-mentioned digital information stored therein does not have a binary one bit in said last-mentioned highest order stage, said second control signal further shifting the information in said second register in the downward direction a number of shifts equal to the number of shifts required to shift the digital information in said third register by said third control signal.

6. Circuit apparatus according to claim 5 wherein said second signal generator further comprises input digital storage means for storing digital information corresponding to said second quantity therein, said control means providing a third transfer signal for transferring the digital information in said digital storage means to said third shift register.

7. Circuit apparatus according to claim 6 wherein said input digital storage means comprises a second buffer register.

8. Circuit apparatus according to claim 6 wherein said second signal generator further comprises converter means for converting a pulse width analogue signal corresponding to said second quantity to digital information for storage in said input digital storage means.

9. Circuit apparatus according to claim 8 wherein said input digital storage means comprises a digital counter.

10. Circuit apparatus according to claim 7 wherein said second signal generator further comprises converter means for converting predetermined pulse width analogue signals corresponding to said second quantity to digital information and a digital counter for storing said last-mentioned digital information therein, and first selective switching means for selectively coupling and second buffer register and said digital counter to said third shift register.

11. Circuit apparatus according to claim 10 wherein said second generator further comprises an analogue signal source having an output for providing an analogue signal corresponding to said second quantity, and second selective switching means for selectively coupling said third analogue output of said third converter and said output of said analogue signal source to the first input of said second pair of inputs of said second comparator.